US008938874B2

(12) United States Patent
Kobayashi et al.

(10) Patent No.: US 8,938,874 B2
(45) Date of Patent: Jan. 27, 2015

(54) LEVER JIG AND CONNECTOR APPARATUS

(71) Applicant: Yazaki Corporation, Minato-ku, Tokyo (JP)

(72) Inventors: Naoki Kobayashi, Toyota (JP); Akihiro Tsuruta, Fujieda (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 14/024,718

(22) Filed: Sep. 12, 2013

(65) Prior Publication Data

US 2014/0013593 A1 Jan. 16, 2014

Related U.S. Application Data

(63) Continuation of application No. PCT/JP2012/056545, filed on Mar. 14, 2012.

(30) Foreign Application Priority Data

Mar. 16, 2011 (JP) ................................ 2011-058091

(51) Int. Cl.

| | |
|---|---|
| ***B23P 19/00*** | (2006.01) |
| ***H01R 43/00*** | (2006.01) |
| ***H01R 43/26*** | (2006.01) |
| ***H01R 13/629*** | (2006.01) |

(52) U.S. Cl.

CPC .......... *H01R 43/26* (2013.01); *H01R 13/62933* (2013.01)

USPC .................. 29/750; 29/752; 29/754; 29/758; 29/764

(58) Field of Classification Search

USPC .................. 29/750, 747, 752, 754, 758, 764; 439/157, 296, 347, 372

See application file for complete search history.

(56) References Cited

U.S. PATENT DOCUMENTS

| | | | | |
|---|---|---|---|---|
| 3,177,567 | A | 4/1965 | Gehrman | |
| 7,568,925 | B2 * | 8/2009 | Ciriello et al. | 439/157 |
| 8,339,695 | B2 * | 12/2012 | Haussler et al. | 359/28 |
| 2009/0203240 | A1 | 8/2009 | Matsumura et al. | |

FOREIGN PATENT DOCUMENTS

| | | | |
|---|---|---|---|
| JP | H5-182739 | A | 7/1993 |
| JP | 2009-187863 | A | 8/2009 |
| JP | 2011-150934 | A | 8/2011 |
| JP | 2011-159574 | A | 8/2011 |
| JP | 2011-258324 | A | 12/2011 |

OTHER PUBLICATIONS

Korean office action issued on Aug. 1, 2014 in the counterpart Korean patent application. (Partial English translation also submitted.).

* cited by examiner

*Primary Examiner* — Thiem Phan

(74) *Attorney, Agent, or Firm* — Marvin A. Motsenbocker; Mots Law, PLLC

(57) ABSTRACT

A lever jig is mounted on a female connector and causes fitting force to act on the female connector and a male connector by an operation from a fitting-operation start position to a fitting-operation completion position. The lever jig includes: a connector mount portion capable of having the female connector inserted in a mounted position; slidable members that are slidably supported by the connector mount portion, hold the female connector in the mounted position, and move by a slide movement to a connector-holding release position to release the female connector from holding in the mounted position; and a lever body that is movably supported by the connector mount portion and in the fitting-operation completion position, moves the slidable members to the connector-holding release position.

4 Claims, 17 Drawing Sheets

LEVER JIG AND CONNECTOR APPARATUS

CROSS REFERENCE TO RELATED APPLICATION

This is a continuation application based on PCT application No. PCT/JP2012/56545 filed on Mar. 14, 2012, which claims the benefit of priority from Japanese Patent Application No. 2011-058091 filed on Mar. 16, 2011, the entire contents of which are incorporated by reference herein.

BACKGROUND OF THE INVENTION

1. Field of the Invention

The present invention relates to a lever jig which fits a pair of connectors each other with weak operational force and a connector apparatus using the same.

2. Description of the Related Art

There have been proposed various connector apparatuses each of which fits a pair of connectors by operating a lever with weak operational force (for example, see Japanese Patent Application Laid-Open Publication No. 2009-187863). Among these connector apparatuses, there is proposed one having a lever to be detachably provided on a connector, that is, as a lever jig. With the lever jig, it is possible to perform the fitting operation for a plurality of connector apparatuses, thereby aiming at reduction of the cost of parts, etc. A conventional example of the lever jig and the connector apparatus using the same is shown in FIGS. 1 to 4. Description will be made below.

A connector apparatus 100 has, as shown in FIG. 1, a lever jig 101, and a female connector 120 and a male connector 130 which are a pair of connectors.

The lever jig 101 has, as shown in detail in FIG. 2, a connector mount portion 102 and a lever body 110 rotatably supported by the connector mount portion 102. The connector mount portion 102 has a pair of side walls 103 and a connecting wall part 104 which connects the pair of side walls 103. On the upper ends of the pair of side walls 103, there are provided upper stopper pieces 103*a* protruding inside each other.

Inside the pair of side walls 103, the female connector 120 can be inserted from the bottom side. On the pair of side walls 103, there are provided connector engagement tabs 105 protruding inside, at a plurality of places, respectively. On the outer surfaces of the pair of side walls 103, there is provided a pair of support pins 106 in a protruding manner. On the pair of side walls 103, there are provided a pair of temporary engagement holes 107 and guide slits 108 communicated with the temporary engagement holes 107. On the pair of side walls 103 and on the lower parts of the temporary engagement holes 107, there are provided lever stopper parts 109 in a protruding manner.

The lever body 110 is provided with a pair of arm parts 111 and an operational part 112 which connects the pair of arm parts 111 at the tips thereof. On the inner surface sides of the pair of arm parts 111, there is provided a pair of pin reception holes 113. To the pair of pin reception holes 113, the support pins 106 of the connector mount portion 102 are inserted, respectively. This enables the lever body 110 to be operated for rotation around the pair of support pins 106 between a fitting-operation start position and a fitting-operation completion position. Inside the pair of arm parts 111, there is provided a pair of boss introduction grooves 114. The pair of arm parts 111 is provided with temporary engagement tabs 115 protruding inside, respectively. The lever body 110 has the temporary engagement tabs 115 engaged to the temporary engagement holes 107 in a position to hit the lever stopper parts 109. The position is the fitting-operation start position for the lever body 110 (see FIG. 1).

As shown in FIG. 1, the female connector 120 and the male connector 130 are provided to be fittable and removable each other. Both of the female connector 120 and the male connector 130 have multiple terminals (not shown) and the mutual multiple terminals (not shown) come in contact in a fitted state. On the upper part of the female connector 120, there are provided flange parts 121 protruding from the both side surfaces thereof. The male connector 130 has a connector fit chamber 131 with its upper part opened. On the both side surfaces of the male connector 130, there are provided a pair of boss parts 132 and a pair of temporary-engagement release guide ribs 133 in a protruding manner.

Next, fitting operation of the female connector 120 and the male connector 130 will be described. The lever body 110 of the lever jig 101 is supposed to be set in the fitting-operation start position. First, from the bottom side of the connector mount portion 102 of the lever jig 101, the female connector 102 is inserted. When inserted in a complete-insertion position, the connector engagement tabs 105 of the connector mount portion 102 are engaged to the flange parts 121 of the female connector 120, thereby connecting the lever jig 101 and the female connector 120.

Next, the female connector 120 is inserted into the connector fit chamber 131 of the male connector 130. Then the temporary-engagement release guide ribs 133 of the male connector 130 move the temporary engagement tabs 115 to a release position, thereby allowing the lever body 110 to be operated for rotation. Also, the pair of boss parts 132 of the male connector 130 is introduced to the pair of boss introduction grooves 114 of the lever body 110, thereby setting the female connector 120 and the male connector 130 in a fitting start position.

Next, the lever body 110 is operated for rotation from the fitting-operation start position to the side of the fitting-operation completion position. Then the pair of boss parts 132 of the male connector 130 moves through the pair of boss introduction grooves 114 of the lever body 110, so that the male connector 130 is drawn toward the female connector 120. That is, the male connector 130 moves to the fitting position side. As shown in FIGS. 3 and 4, the lever body 110 has its rotational operation proceeded to come close to the fitting-operation completion position, so that the upper right-and-left ends of the male connector 130 hit the connector engagement tabs 105 of the connector mount portion 102. The lever body 110 is further rotated from this state to the fitting-operation completion position, so that the male connector 130 is drawn to the fitting-operation completion position and each of the connector engagement tabs 105 is moved to the release position. This is the completion of the fitting operation of the female connector 120 and the male connector 130. Since each of the connector engagement tabs 105 is moved to the release position, it is possible to remove the lever jig 101 from the female connector 120.

However, for the above-noted conventional lever jig 101 and the connector apparatus 100 using the same, if the female connector 120 and the male connector 130 incline in a relative position during the fitting operation, a connector engagement tab 105 on a side where deeply drawn is moved to the release position in a position before the fitting-operation completion position. If a part of the connector engagement tabs 105 is moved to the release position, the lever jig 101 becomes detachable from the female connector 120. Accordingly, there is a risk of detaching the lever jig 101 from the female connector 120 in a half-fitted state between the female connector 120 and the male connector 130.

SUMMARY OF THE INVENTION

In view of the foregoing problem, the present invention has an object to provide a lever jig and a connector apparatus using the same, which surely prevents a detachment in a half-fitted state between a pair of connectors.

The present invention provides a lever jig which is mounted on one of a pair of connectors and causes fitting force to act on the pair of connectors by an operation from a fitting-operation start position to a fitting-operation completion position so as to move the pair of connectors from a fitting start position to a fitting completion position, the lever jig including: a connector mount portion capable of having one of the pair of connectors inserted to a mounted position; slidable members that are slidably supported by the connector mount portion, hold one of the pair of connectors in the mounted position, and move by a slide movement to a connector-holding release position to release one of the pair of connectors from holding in a holding position; and a lever body that is movably supported by the connector mount portion and in the fitting-operation completion position, moves the slidable members to the connector-holding release position.

It is preferable to configure that the slidable members have protruding fixation parts in positions corresponding to protruding fixation parts of one of the pair of connectors, and respective protruding fixation parts on the right and left of the slidable members move, in a position other than the connector-holding release position for the slidable members, to a position to overlap with the protruding fixation parts of one of the connectors, and in the connector-holding release position for the slidable members, to a position not to overlap with the protruding fixation parts of one of the connectors.

Another of the present invention provides a connector apparatus including: a pair of connectors that are fittable each other; and a lever jig that is mounted on one of the pair of connectors, and causes fitting force to act on the pair of connectors by an operation from an operation start position to an operation completion position so as to move the pair of connectors from a fitting start position to a fitting completion position, wherein one of the connectors is provided to be mounted on the lever jig and detached from a mounted position, the lever jig has: a connector mount portion capable of having one of the connectors inserted in the mounted position; slidable members that are slidably supported by the connector mount portion, hold one of the connectors in the mounted position, and move by a slide movement to a connector-holding release position to release one of the connectors from holding in the mounted position; and a lever body that is movably supported by the connector mount portion and moves the slidable members to the connector-holding release position in a fitting-operation completion position.

It is preferable to configure that one of the connectors has a plurality of protruding fixation parts, the slidable members have a plurality of protruding fixation parts in positions corresponding to the protruding fixation parts of one of the connectors, and each of the protruding fixation parts of one of the connectors and the slidable members moves, in a position other than the connector-holding release position for the slidable members, to a position to overlap each other, and in the connector-holding release position for the slidable members, to a position not to overlap each other.

According to the present invention, a lever jig is operated from a fitting-operation start position to a fitting-operation completion position, and only after the lever jig is operated to the fitting-operation completion position or to an operational position which goes beyond the fitting-operation completion position, slidable members move to a connector-holding release position, thereby allowing the lever jig to be detachable from one of connectors. Accordingly, the detachment is not possible in a half-fitted state between the pair of connectors, thereby surely preventing the detachment in a half-fitted state for the pair of connectors.

DESCRIPTION OF THE EMBODIMENTS

An embodiment of the present invention will be described below with reference to the drawings.

Figure 1:
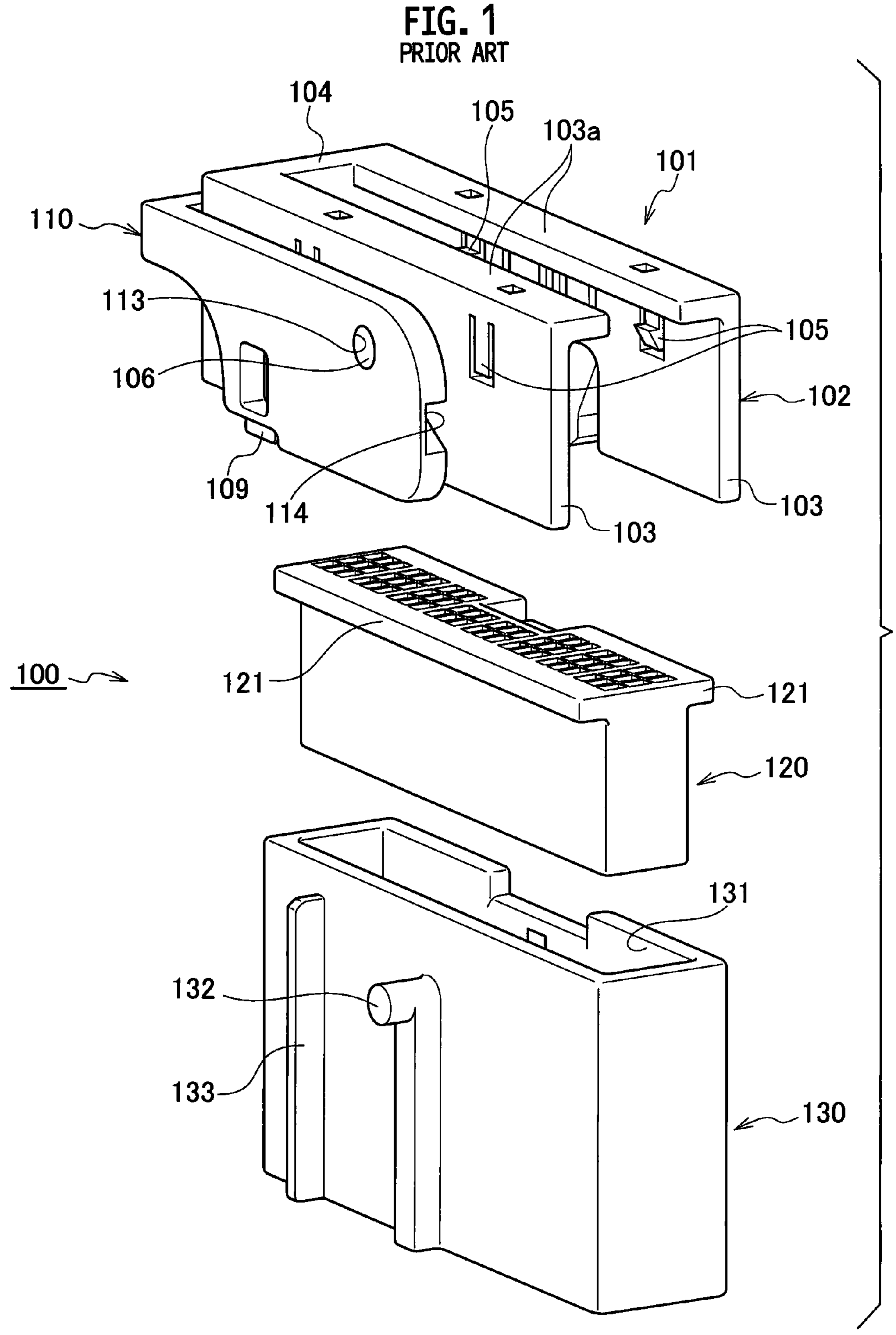
FIG. 1 PRIOR ART
FIG. 1 is an exploded perspective view of a connector apparatus, showing a conventional example.
Figure 2:
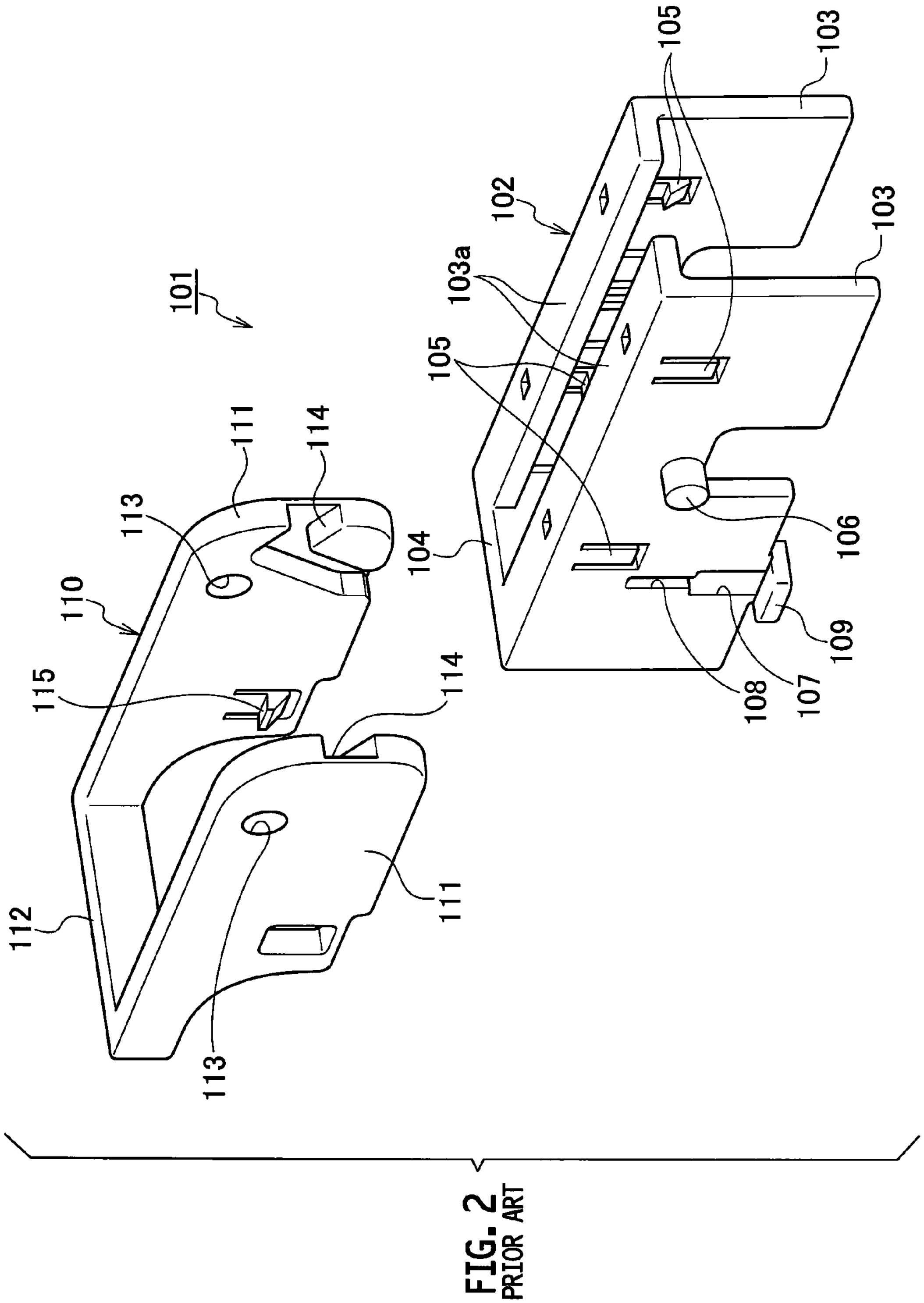
FIG. 2 PRIOR ART
FIG. 2 is an exploded perspective view of a lever jig, showing the conventional example.
Figure 3:
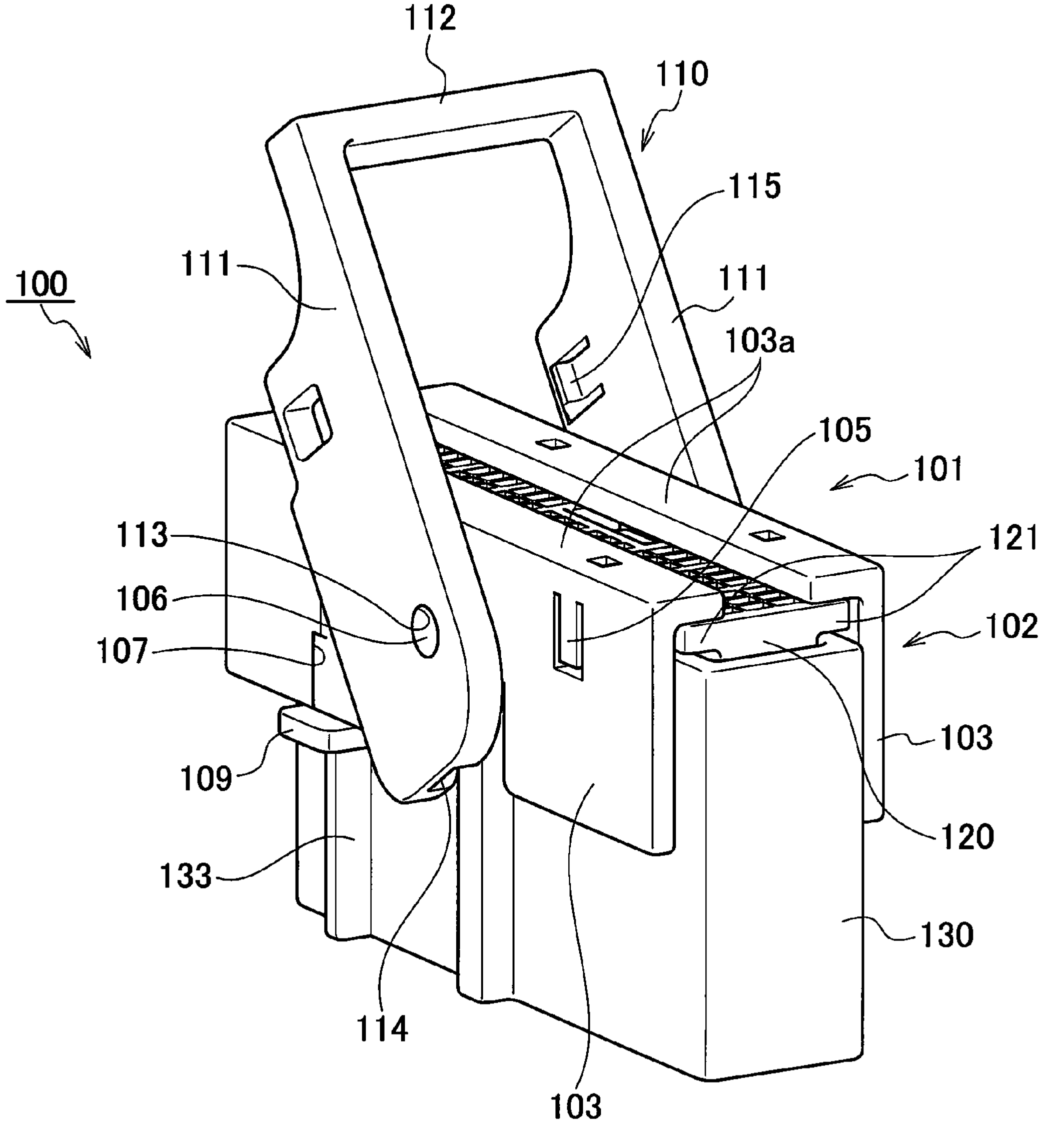
FIG. 3 PRIOR ART
FIG. 3 is a perspective view showing a process of connector fitting work, showing the conventional example.
Figure 4:
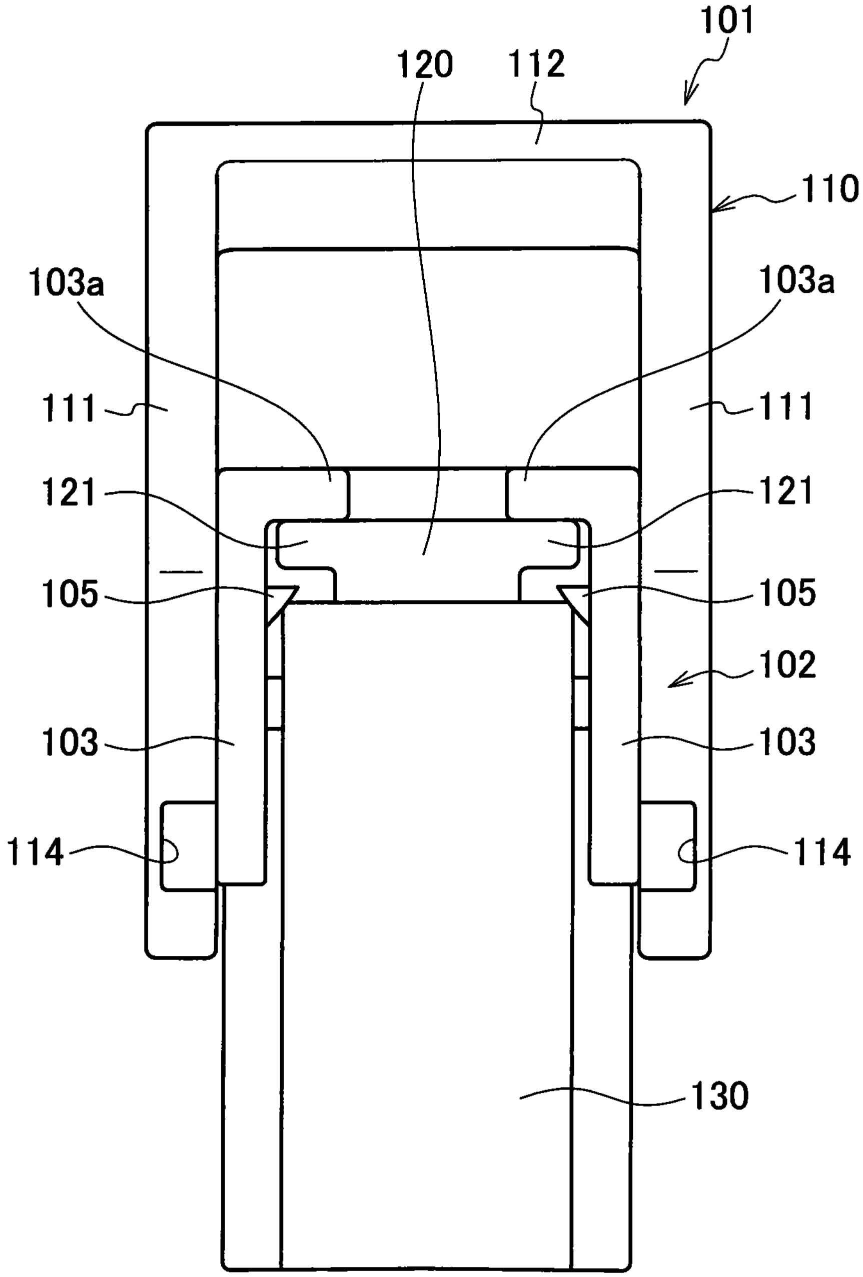
FIG. 4 PRIOR ART
FIG. 4 is a side view showing a process of the connector fitting work, showing the conventional example.
Figure 5:
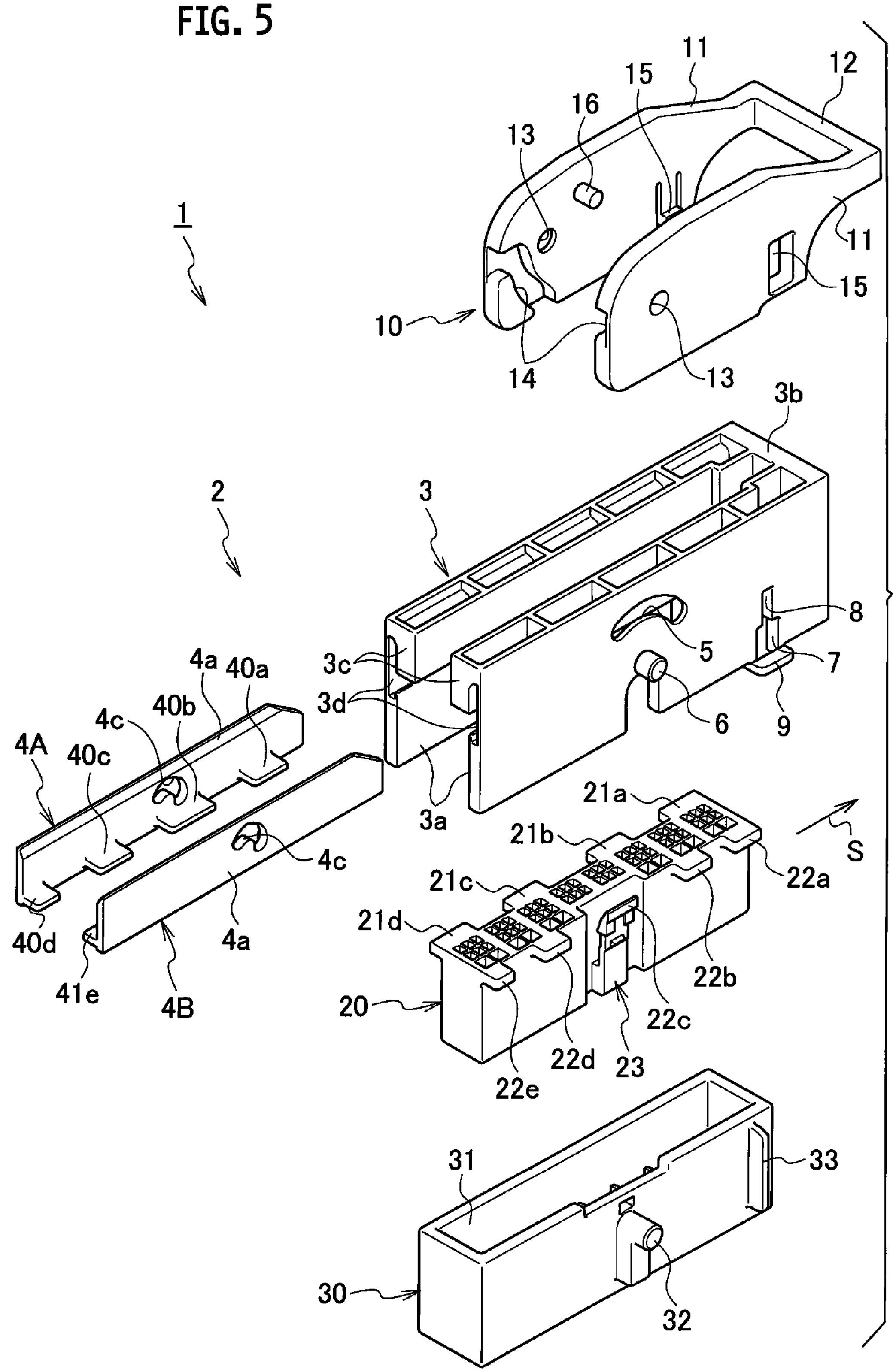
FIG. 5 is an exploded perspective view of a connector apparatus, showing one embodiment of the present invention.
Figure 6:
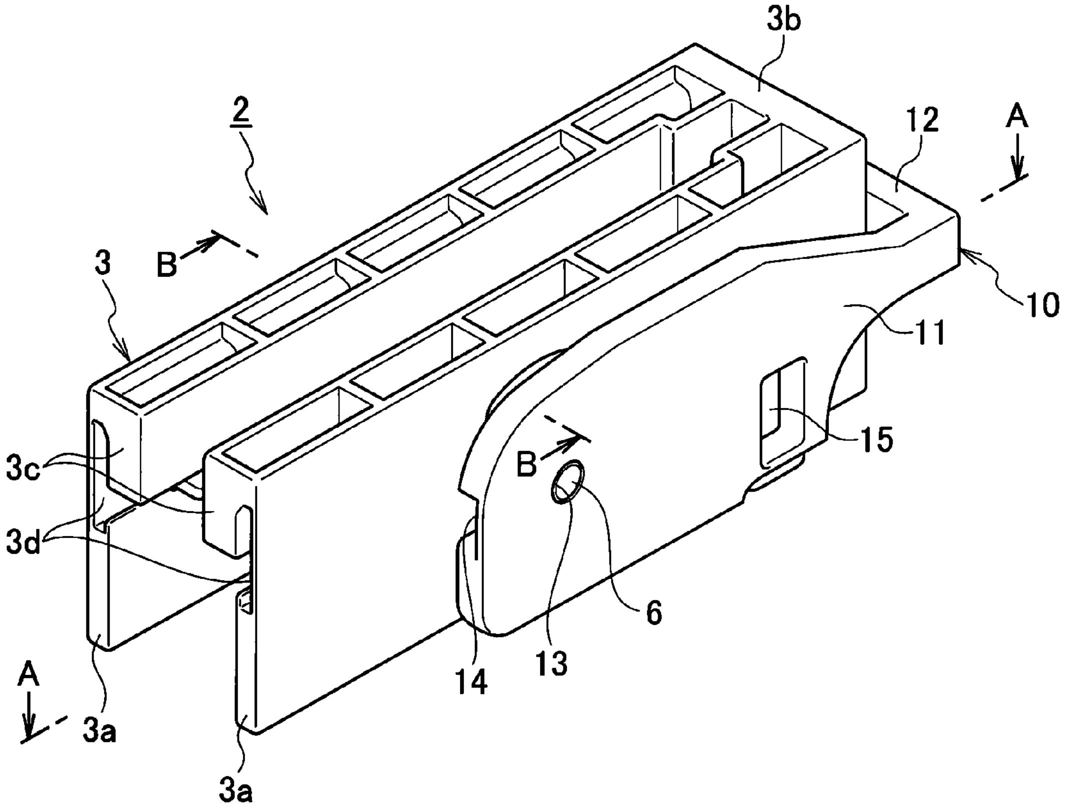
FIG. 6 is a perspective view of a lever jig, showing one embodiment of the present invention.
Figure 7A:
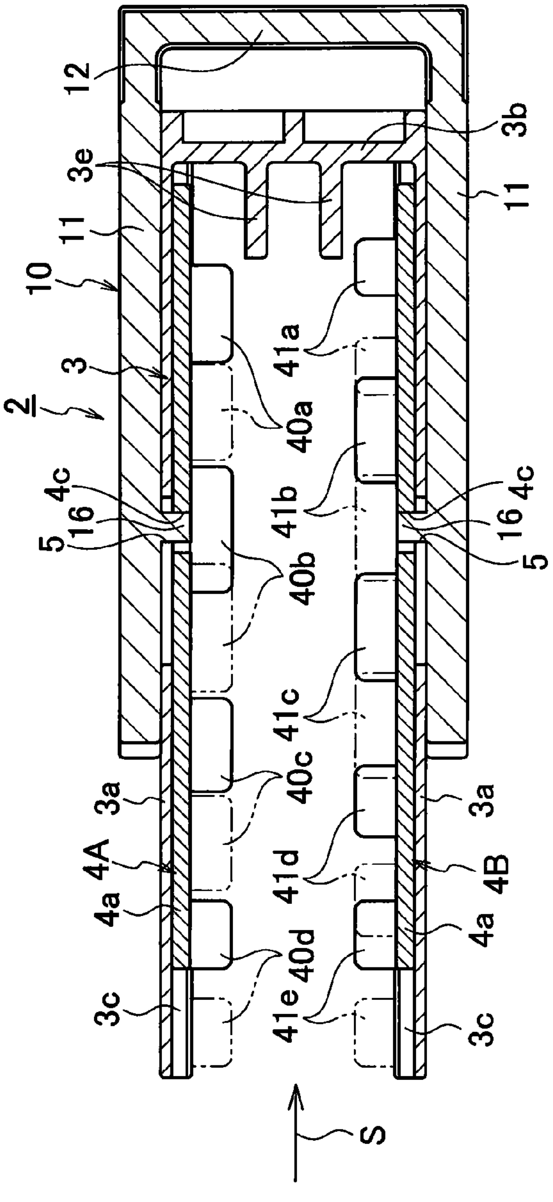
FIG. 7A is a cross-sectional view of FIG. 6 along the line A-A, showing one embodiment of the present invention.
Figure 7B:
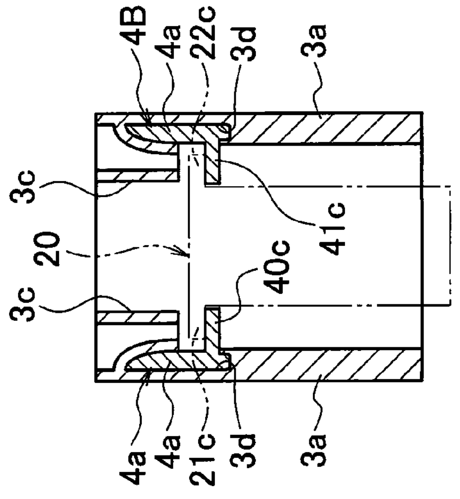
FIG. 7B is a cross-sectional view of FIG. 6 along the line B-B, showing one embodiment of the present invention.
Figure 8A:
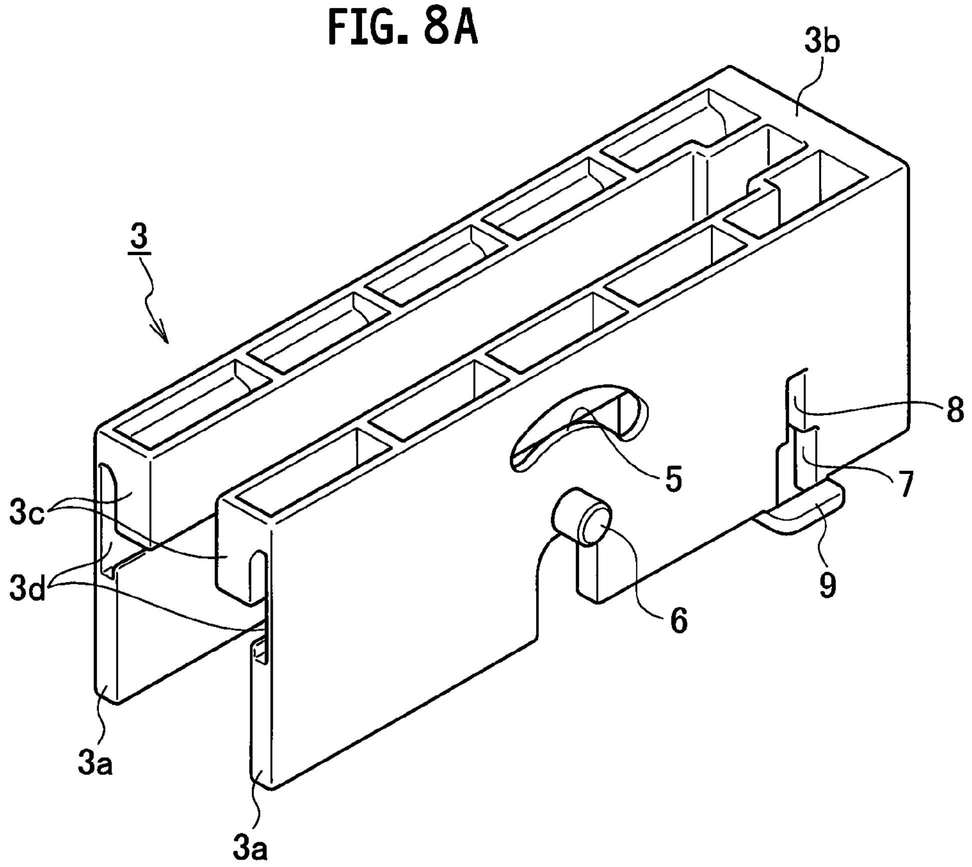
FIG. 8A is a perspective view of a connector mount portion of the lever jig, showing one embodiment of the present invention.
Figure 8B:
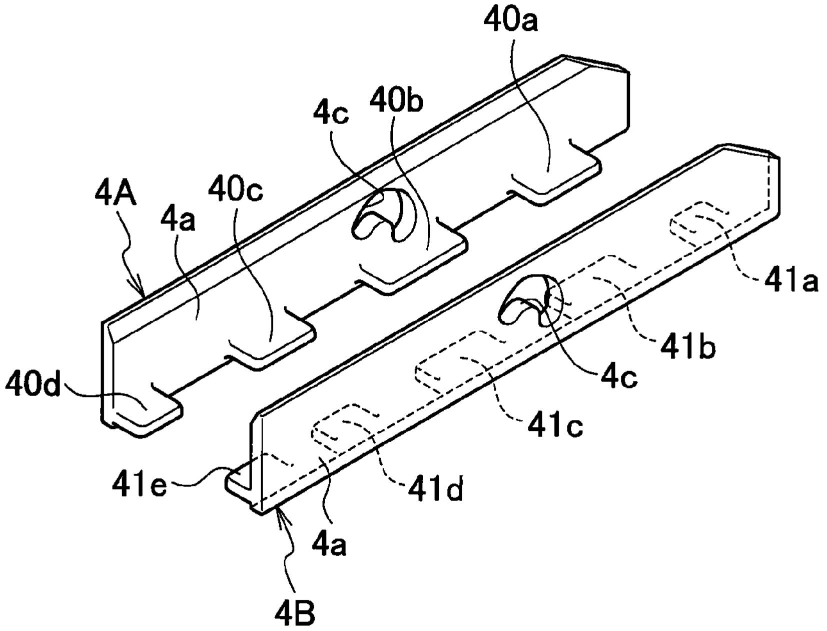
FIG. 8B is a perspective view of slidable members, showing one embodiment of the present invention.
Figure 9:
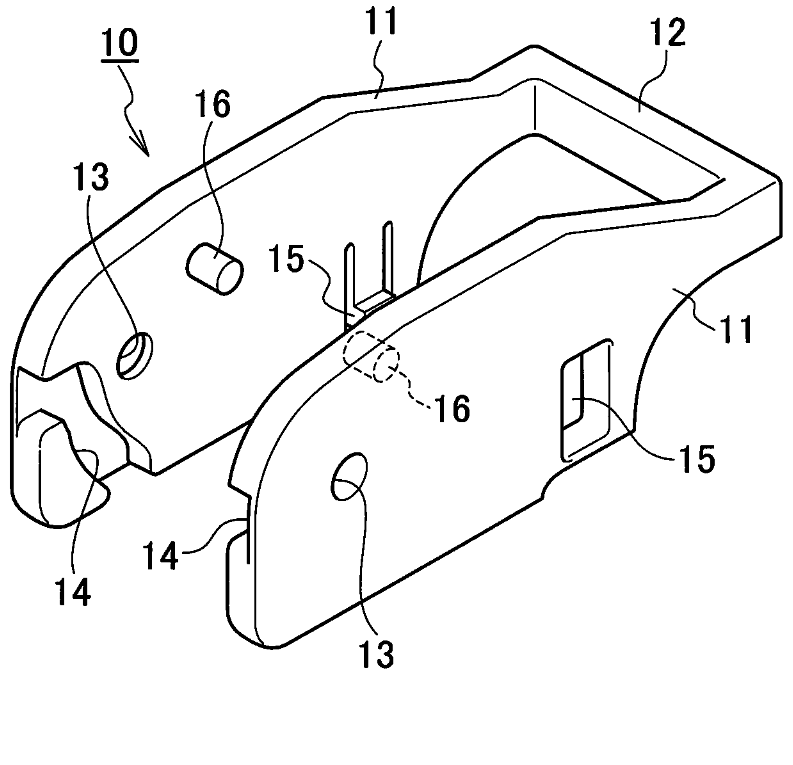
FIG. 9 is an exploded perspective view of a lever body of the lever jig, showing one embodiment of the present invention.

FIGS. 5 to 17 show one embodiment of the present invention. As shown in FIG. 5, a connector apparatus 1 has a lever jig 2, and a female connector 20 and a male connector 30 which are a pair of connectors.

The lever jig 2 has, as shown in FIGS. 5 to 9, a connector mount portion 3, a pair of slidable members 4A and 4B slidably received within the connector mount portion 3, and a lever body 10 rotatably supported on the outside of the connector mount portion 3.

The connector mount portion 3 has a pair of side walls 3*a*, a rear connecting wall 3*b* connecting the side walls 3*a*, and a pair of upper-surface restriction walls 3*c* protruding inside from the upper parts of the side walls 3*a*, respectively. Within the connector mount portion 3, there is formed a space for receiving the female connector 20. The female connector 20 is inserted to and removed from the space from the front surface side and the bottom surface side of the connector mount portion 3. On the inner surface side of the pair of side walls 3*a*, there is provided a pair of slide rail parts 3*d*. The pair of slide rail parts 3*d* is provided to get into the upper-surface restriction walls 3*c*. The pair of slide rail parts 3*d* is provided along the length of the side walls 3*a*.

On the pair of side walls 3*a*, there is provided a pair of pin relief holes 5. The pin relief holes 5 are set as a circular-shape along the rotation locus of slidable pins 16 of the lever body 10 which will be described later and as the same or longer size than the range of the rotation locus of the slidable pins 16.

On the outer surfaces of the pair of side walls 3*a*, there is provided a pair of support pins 6 in a protruding manner. On the pair of side walls 3*a*, there are provided a pair of temporary engagement holes 7 and guide slits 8 communicating with the temporary engagement holes 7, respectively. On the outer surfaces of the pair of side walls 3*a*, there are provided lever stopper parts 9 in a protruding manner below the temporary engagement holes 7.

On the rear connecting wall 3*b*, there is provided stopper walls 3*e* in a protruding manner toward a space inside the pair of side walls 3*a*. The female connector 20 inserted from the front surface side of the connector mount portion 3 is insertable to a position to hit the stopper walls 3*e*. The position is a mounted position for the female connector 20.

Also, the connector mount portion 3 is provided with a slide-lock means (not shown) to prevent the female connector 20, which is in the mounted position, from slidably moving to the front surface side.

Each of the slidable members 4A and 4B has a slidable body 4*a* and a plurality of protruding fixation parts 40*a* to 40*d* (or 41*a* to 41*e*) protruding from the slidable body 4*a* toward inside. Each of the slidable bodies 4*a* is provided with a pin interference hole 4*c* having a curved shape. The pin interference hole 4*c* has a circular-arc shape along the rotation locus of the slidable pin 16 of the lever body 10 which will be described later, and is set as a shorter size than the range of the rotation locus of the slidable pin 16. This allows the pair of slidable members 4A and 4B to receive slide force by a rotational operation of the lever body 10. With the slide force, the pair of slidable members 4A and 4B slidably moves between a connector initially-holding position (solid lines in FIG. 7A) and a connector-holding release position (imaginary lines in FIG. 7A).

Detailed description of arrangement patterns of the plurality of protruding fixation parts 40*a* to 40*d* and 41*a* to 41*e* will be made below.

The lever body 10 is provided with a pair of arm parts 11 and an operational part 12 which connects the pair of arm parts 11 at the tips thereof. On the inner surface sides of the pair of arm parts 11, there is provided a pair of pin reception holes 13. To the pair of pin reception holes 13, the support pins 6 of the connector mount portion 3 are inserted, respectively. This enables the lever body 10 to be operated for rotation around the pair of support pins 6 between a fitting-operation start position and a fitting-operation completion position. Inside the pair of arm parts 11, there is provided a pair of boss introducing grooves 14. Each of the boss introducing grooves 14 opens toward a directly below position in the fitting-operation start position and in the fitting-operation completion position for the lever body 10, respectively. That is, in the fitting-operation start position and the fitting-operation completion position for the lever body 10, boss parts 32 of the male connector 30 which will be described later are inserted to and removed from the boss introducing grooves 14.

The pair of arm parts 11 is provided with temporary engagement tabs 15 protruding inside. The lever body 10 has the temporary engagement tabs 15 engaged to the temporary engagement holes 7 in a position to hit the lever stopper parts 9. The position is the fitting-operation start position for the lever body 10 (see FIGS. 10 and 11).

Inside the pair of arm parts 11, there is provided the pair of slidable pins 16. The pair of slidable pins 16 is inserted in the pair of pin relief holes 5 of the connector mount portion 3 and the pin interference holes 4*c* of the pair of slidable members 4A and 4B. When the pair of slidable members 4A and 4B is positioned in the connector holding position, the pair of slidable pins 16 moves in the pin interference holes 4*c* in the first-half operational process of the rotational operation from the fitting-operation start position to the fitting-operation completion position for the lever body 10. Accordingly, in the first-half operational process, the pair of slidable members 4A and 4B does not slide with the operation of the lever body 10, and holds positioning in the connector initially-holding position. In the latter-half operational process for the lever body 10, the pair of slidable pins 16 presses the edge faces of the pin interference holes 4*c*, so that the pair of slidable members 4A and 4B starts sliding to the side of the connector-holding release position, thereby moving to the connector-holding release position in the fitting-operation completion position.

That is, the lever body 10 performs both of the fitting of the female connector 20 and the male connector 30, and the sliding of the pair of slidable members 4A and 4B.

As shown in FIG. 5, the female connector 20 and the male connector 30 are provided to be fittable and removable each other. Both of the female connector 20 and the male connector 30 have multiple terminals (not shown) and the both mutual multiple terminals (not shown) come in contact in a fitted state.

On the upper parts of the both side surfaces of the female connector 20, there are provided a plurality of protruding fixation parts 21*a* to 21*d* and 22*a* to 22*e*, respectively. The plurality of protruding fixation parts 21*a* to 21*d*, 22*a*, 22*b*, 22*d*, and 22*e* are configured by being provided on the housing in a protruding manner from the upper ends thereof. Only the protruding fixation part 22*c* is configured by utilizing an operational part of a connector lock part 23.

Here, there will be described arrangement patterns for the protruding fixation parts 21*a* to 21*d* and 22*a* to 22*e* on the female connector 20 side, and the protruding fixation parts 40*a* to 40*d* and 41*a* to 41*e* on the slidable members 4A and 4B side.

The protruding fixation parts 40*a* to 40*d* and 41*a* to 41*e* of the slidable members 4A and 4B and the protruding fixation parts 21*a* to 21*d* and 22*a* to 22*e* on the female connector 20 side are arranged at intervals, respectively. The protruding fixation parts 40*a*, 40*d*, 41*a* and 41*e* on the both end positions of the pair of slidable members 4A and 4B and the protruding fixation parts 21*a*, 21*d*, 22*a* and 22*e* on the both end positions of the female connector 20 side are respectively provided at approximately same positions with respect to a connector insertion direction S (slide direction), while the protruding fixation parts 40*b*, 40*c* and 41*b* to 41*d* and the protruding fixation parts 21*b*, 21*c* and 22*b* to 22*d* which are in the middle positions are provided alternately with respect to the connector insertion direction S (slide direction).

During the process of the female connector 20 to be slid for insertion into the connector mount portion 3, either of the protruding fixation parts 21*a* to 21*d* and 22*a* to 22*e* has at least a part thereof put on the protruding fixation parts 40*a* to 40*d* and 41*a* to 41*e* of the pair of slidable members 4A and 4B, so that the female connector 20 is smoothly slid on the pair of slidable members 4A and 4B to be inserted to the mounted position. Now, when the pair of slidable members 4A and 4B is in a position (including a connector initially-holding position in FIG. 7A) other than the connector-holding release position (imaginary line position in FIG. 7A), the protruding fixation parts 40*a* to 40*d* and 41*a* to 41*e* are positioned in a position to have at least a part thereof overlapped with the protruding fixation parts 21*a* to 21*d* and 22*a* to 22*e* of the female connector 20. Accordingly, in the position other than the connector-holding release position, the female connector 20 is held in the mounted position. In the connector-holding release position (imaginary line position in FIG. 7A), the protruding fixation parts 40*a* to 40*d* and 41*a* to 41*e* are positioned in a position not to overlap with the protruding fixation parts 21*a* to 21*d* and 22*a* to 22*e* of the female connector 20. Accordingly, in the connector-holding release position, the female connector 20 in the mounted position is not held.

The male connector 30 has a connector fitting chamber 31 with its upper part opened. On the both side surfaces of the male connector 30, there is provided a pair of boss parts 32 in a protruding manner.

Next, the fitting work of the female connector 20 and the male connector 30 will be described. The lever body of the lever jig 2 is supposed to be set in the fitting-operation start position. In the fitting-operation start position, the pair of slidable members 4A and 4B is positioned in the connector initially-holding position.

Figure 10:
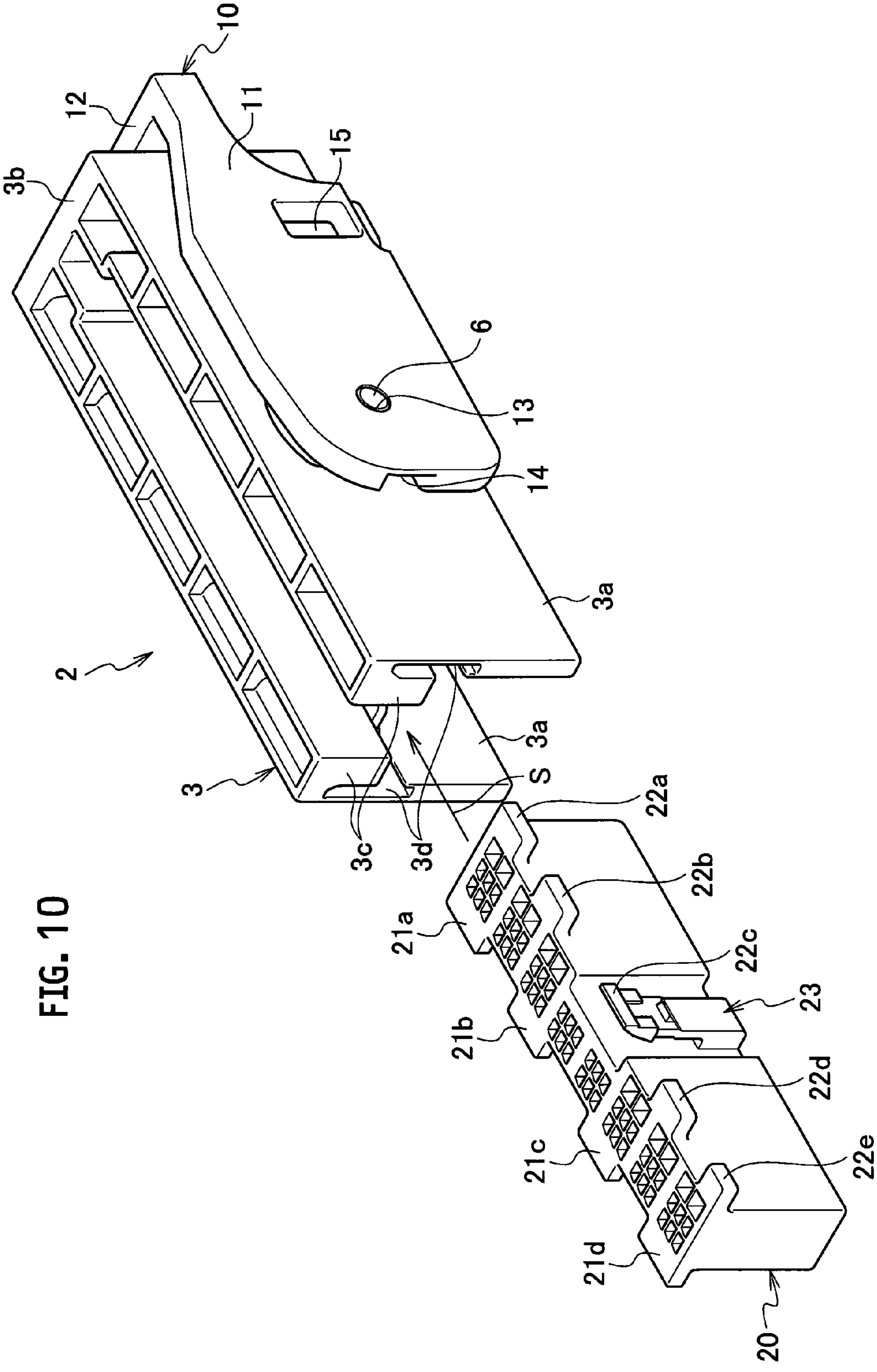
FIG. 10 is a perspective view showing a process of connector fitting work, showing one embodiment of the present invention.

First, as shown in FIG. 10, within the connector mount portion 3 of the lever jig 2, from the front surface side thereof, the female connector 20 is inserted. The female connector 20 is inserted to the mounted position to hit stopper walls 3*e* of the connector mount portion 3. The female connector 20 in the mounted position is positioned by a slide-lock means (not shown) so as not to be detached from the connector mount portion 3. This is the completion of the setting of the female connector 20 to the lever jig 2.

Figure 11:
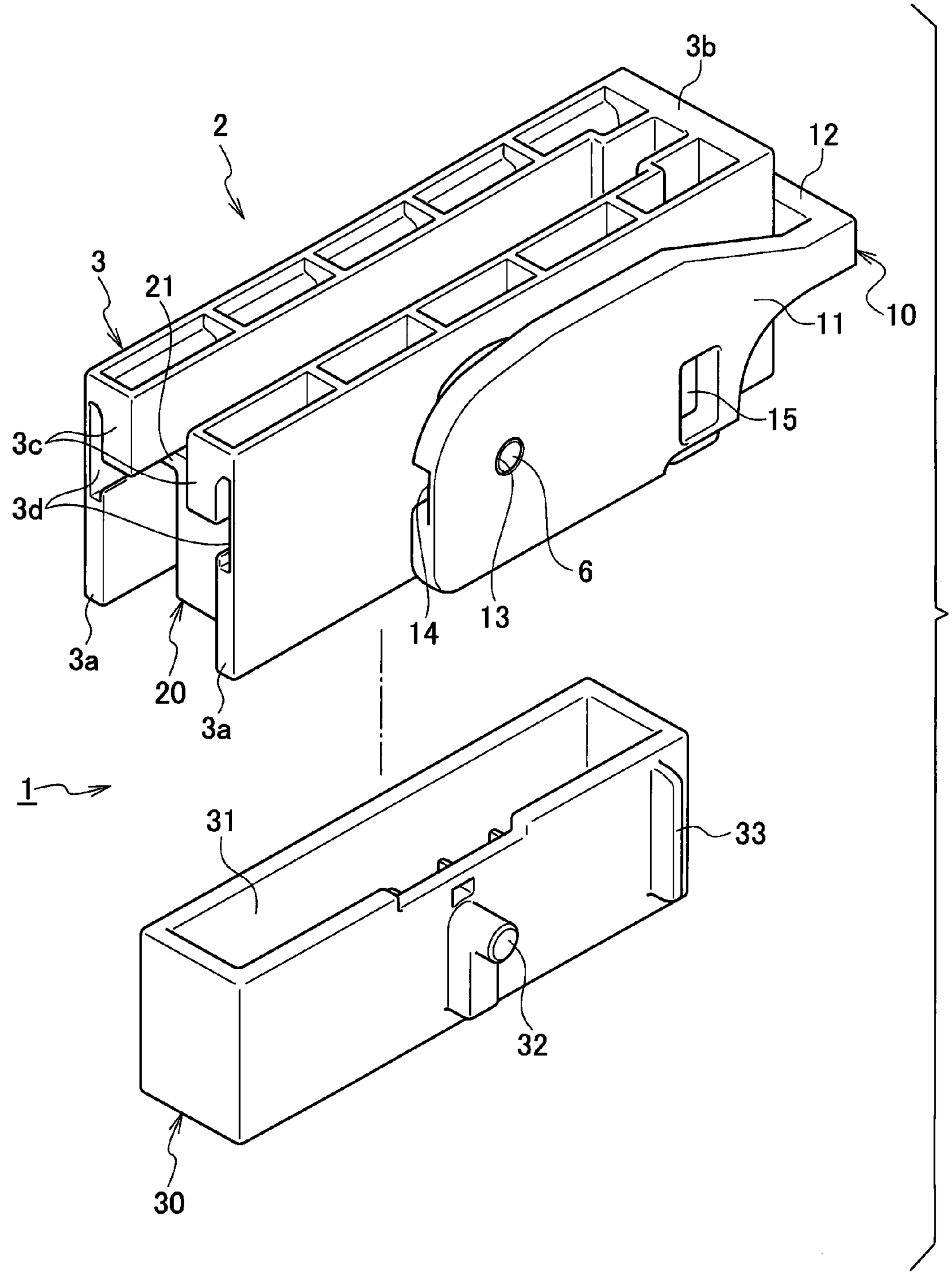
FIG. 11 is a perspective view showing a process of the connector fitting work, showing one embodiment of the present invention.

Next, as shown in FIG. 11, in the connector fitting chamber 31 of the male connector 30, the female connector 20 is inserted. With the insertion, the pair of boss parts 32 of the male connector 30 is introduced to the pair of boss introducing grooves 14 of the lever body 10, thereby setting the female connector 20 and the male connector 30 in the fitting start position.

Figure 12:
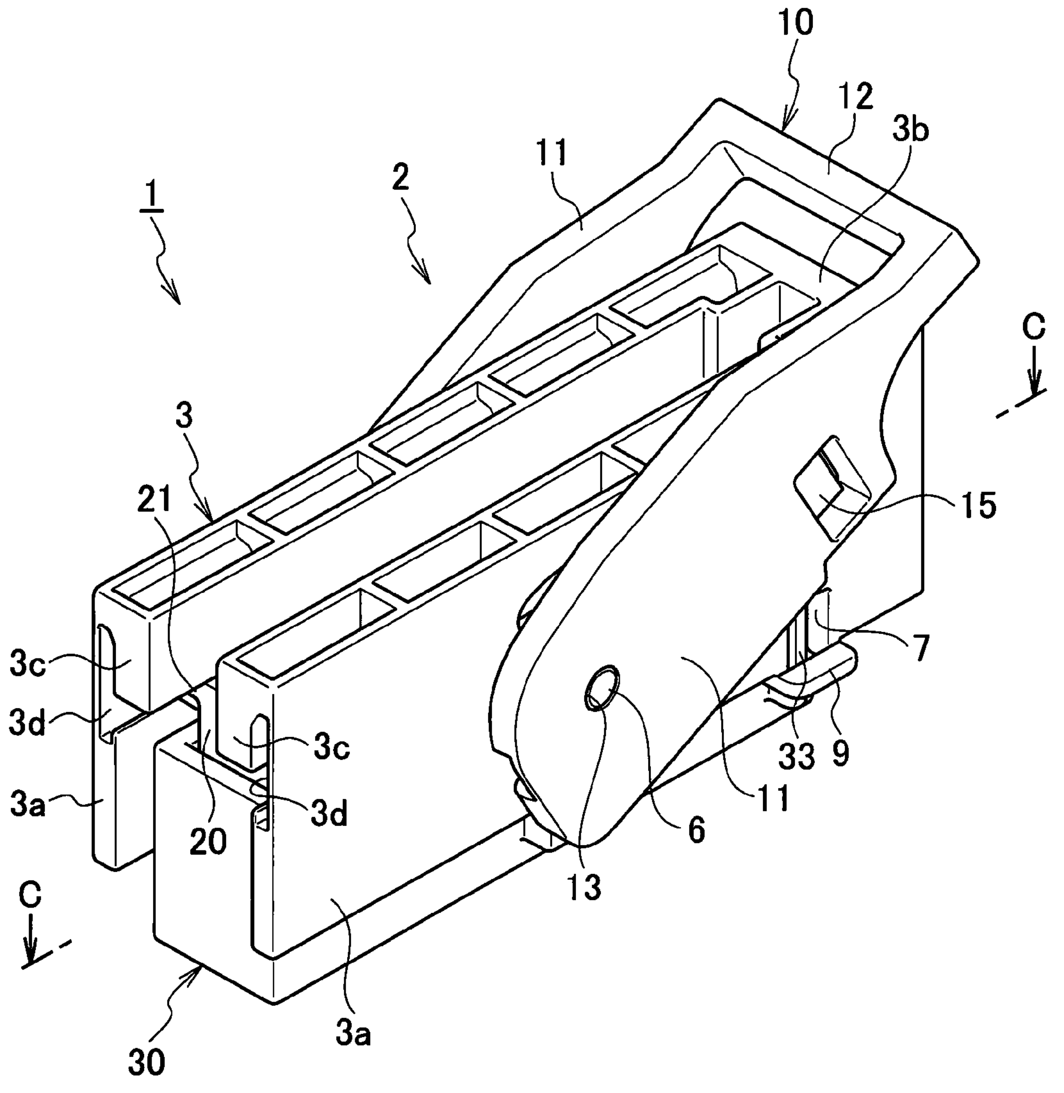
FIG. 12 is a perspective view showing a process of the connector fitting work, showing one embodiment of the present invention.
Figure 16:
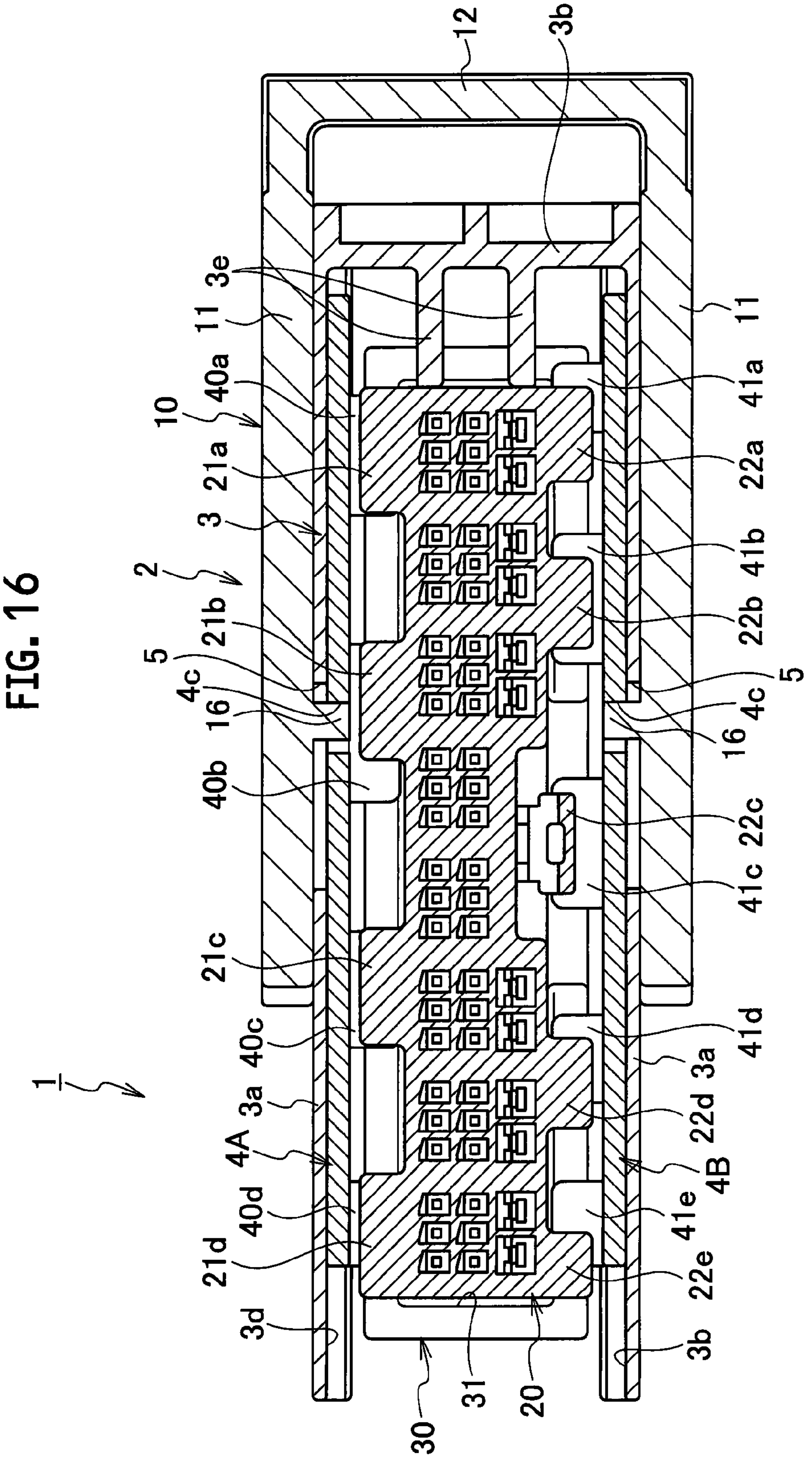
FIG. 16 is a sectional view of FIG. 12 along the line C-C, showing one embodiment of the present invention.

Next, as shown in FIG. 12, the lever body 10 is operated for rotation from the fitting-operation start position to the side of the fitting-operation completion position. Then the pair of boss parts 32 of the male connector 30 moves through the pair of boss introducing grooves 14 of the lever body 10, thereby the male connector 30 is drawn to the female connector 20. That is, the male connector 30 moves to the fitting position side. Also in the first-half operational process from the fitting-operation start position to the fitting-operation completion position for the lever body 10, as shown in FIG. 16, the pair of slidable members 4A and 4B does not move by sliding and holds the female connector 20 in the mounted position, thereby the female connector 20 is not detachable.

Figure 13:
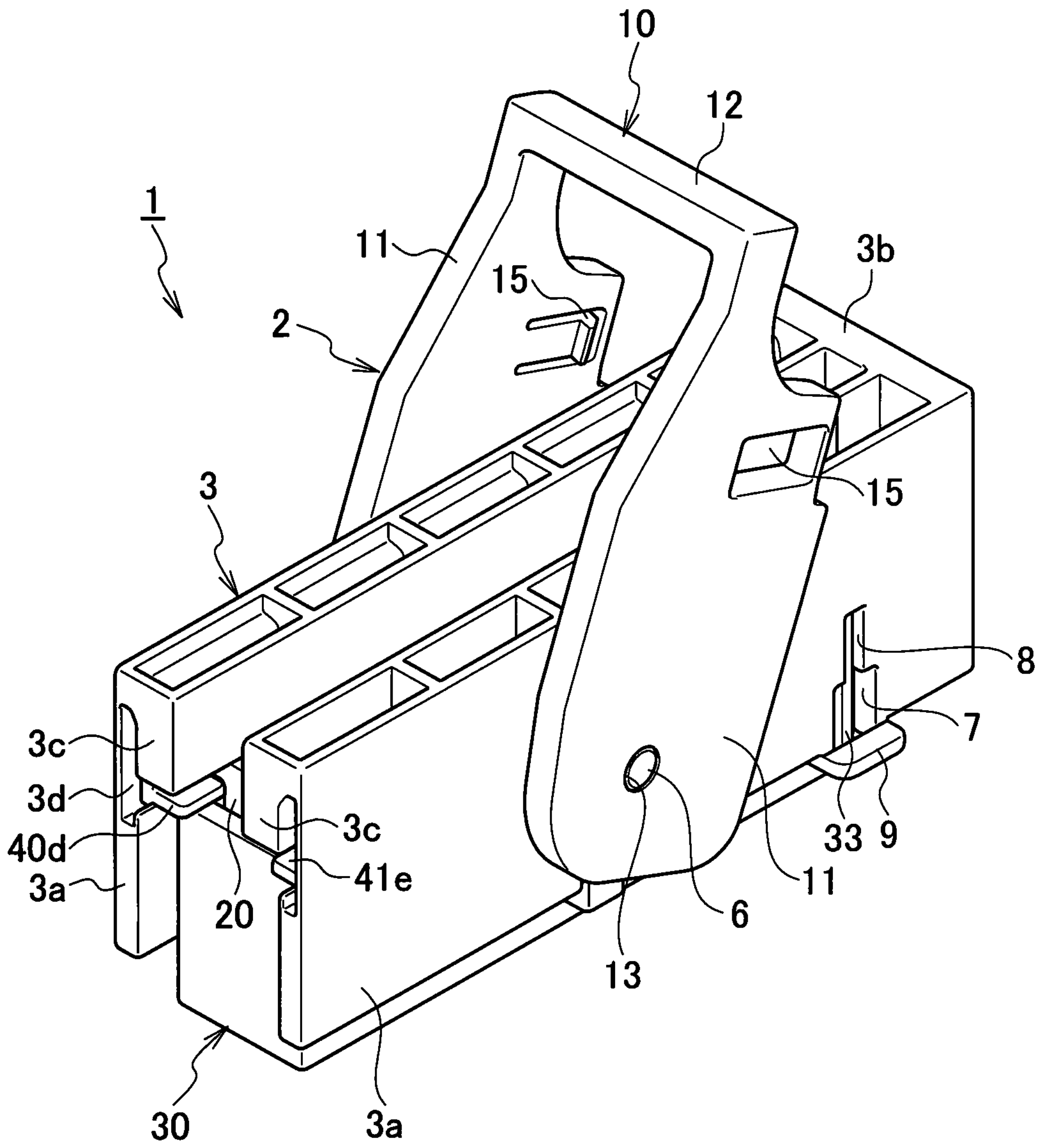
FIG. 13 is a perspective view showing a process of the connector fitting work, showing one embodiment of the present invention.

As the rotational operation of the lever body 10 is proceeded to be in the latter-half process to the fitting-operation completion position, as shown in FIG. 13, the pair of slidable members 4A and 4B then starts sliding from the connector initially-holding position to the side of the connector-holding release position. With the sliding of the pair of slidable members 4A and 4B, although the overlapped areas of the protruding fixation parts 40*a* to 40*d* and 41*a* to 41*e* on the slidable members 4A and 4B side and the protruding fixation parts 21*a* to 21*d* and 22*a* to 22*e* of the female connector 20 gradually reduce, the pair of slidable members 4A and 4B holds the mounted position.

Figure 14:
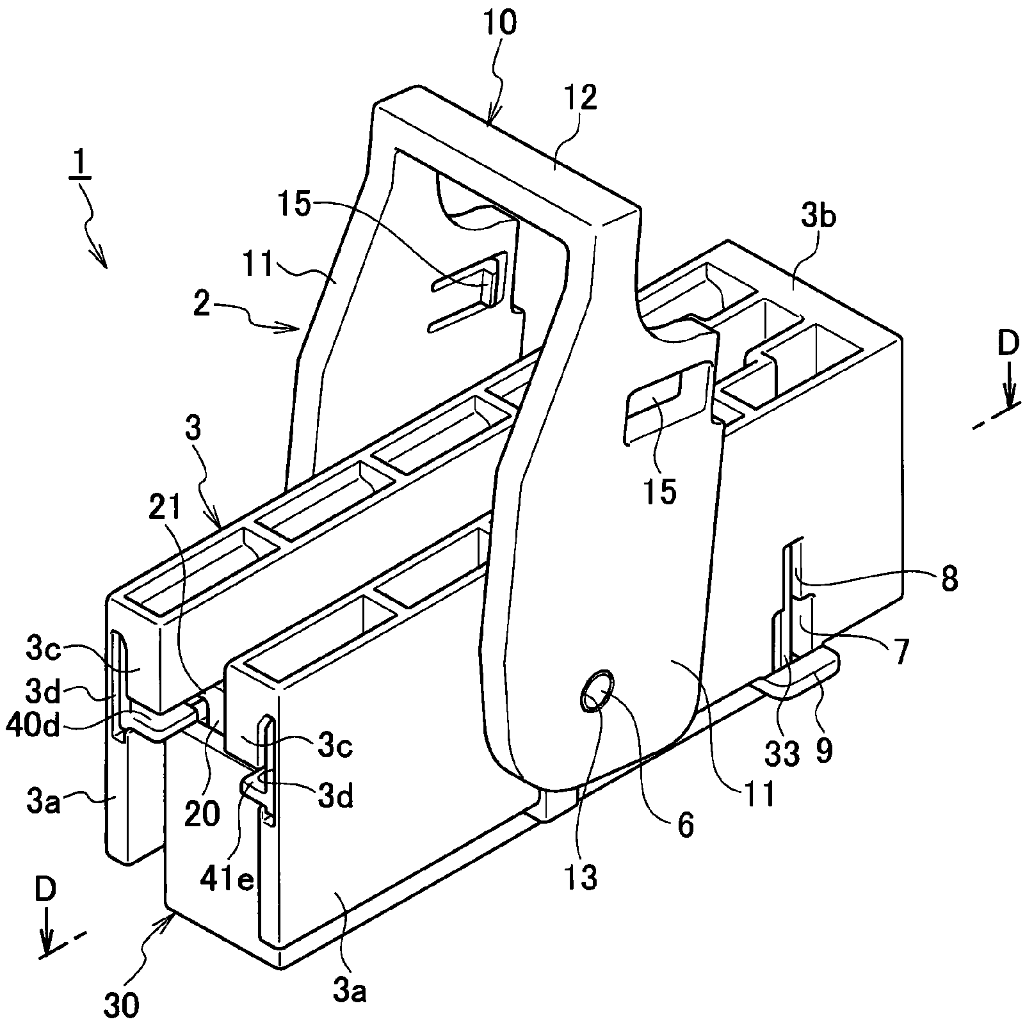
FIG. 14 is a perspective view showing a process of the connector fitting work, showing one embodiment of the present invention.
Figure 15:
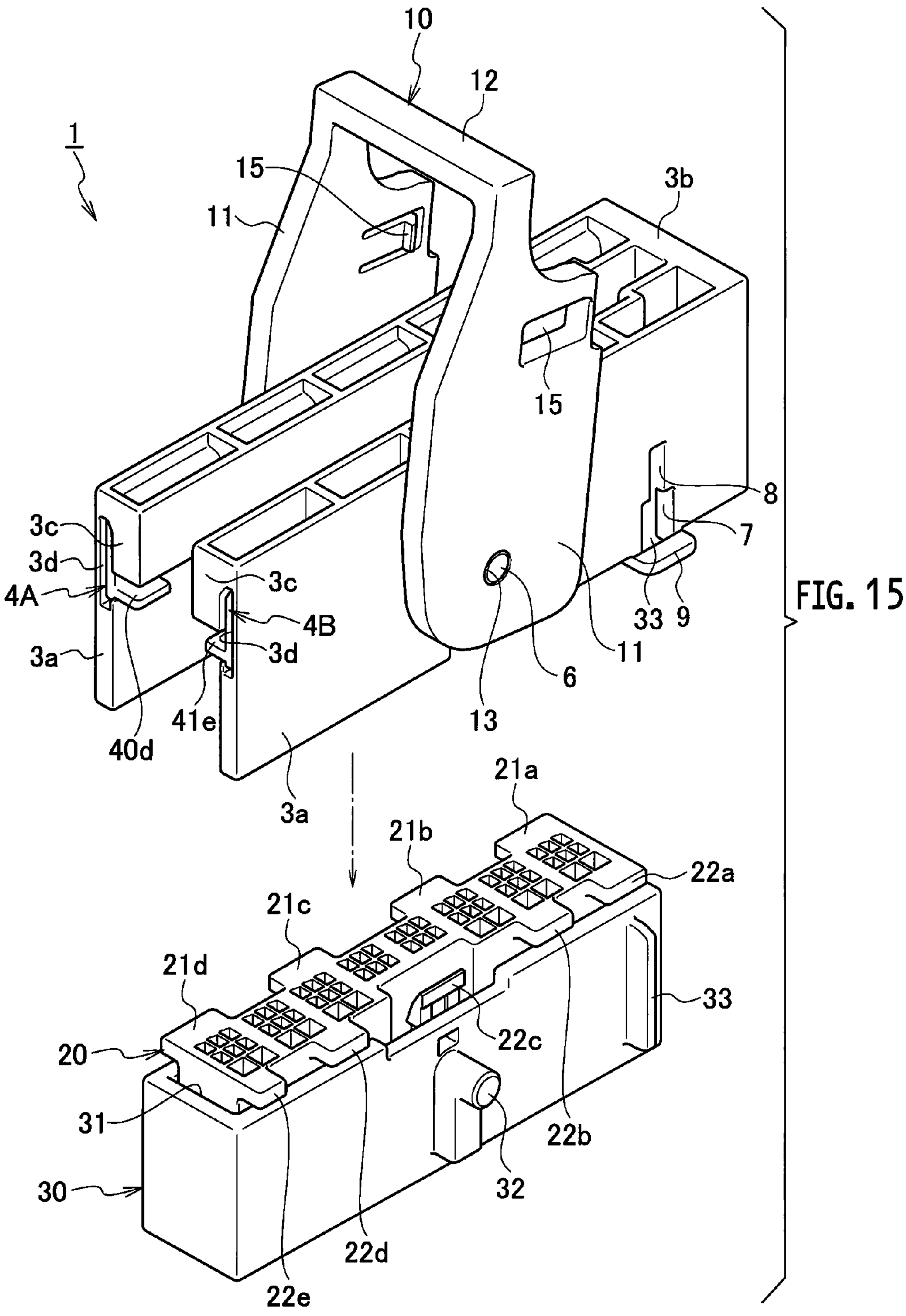
FIG. 15 is a perspective view showing a process of the connector fitting work, showing one embodiment of the present invention.
Figure 17:
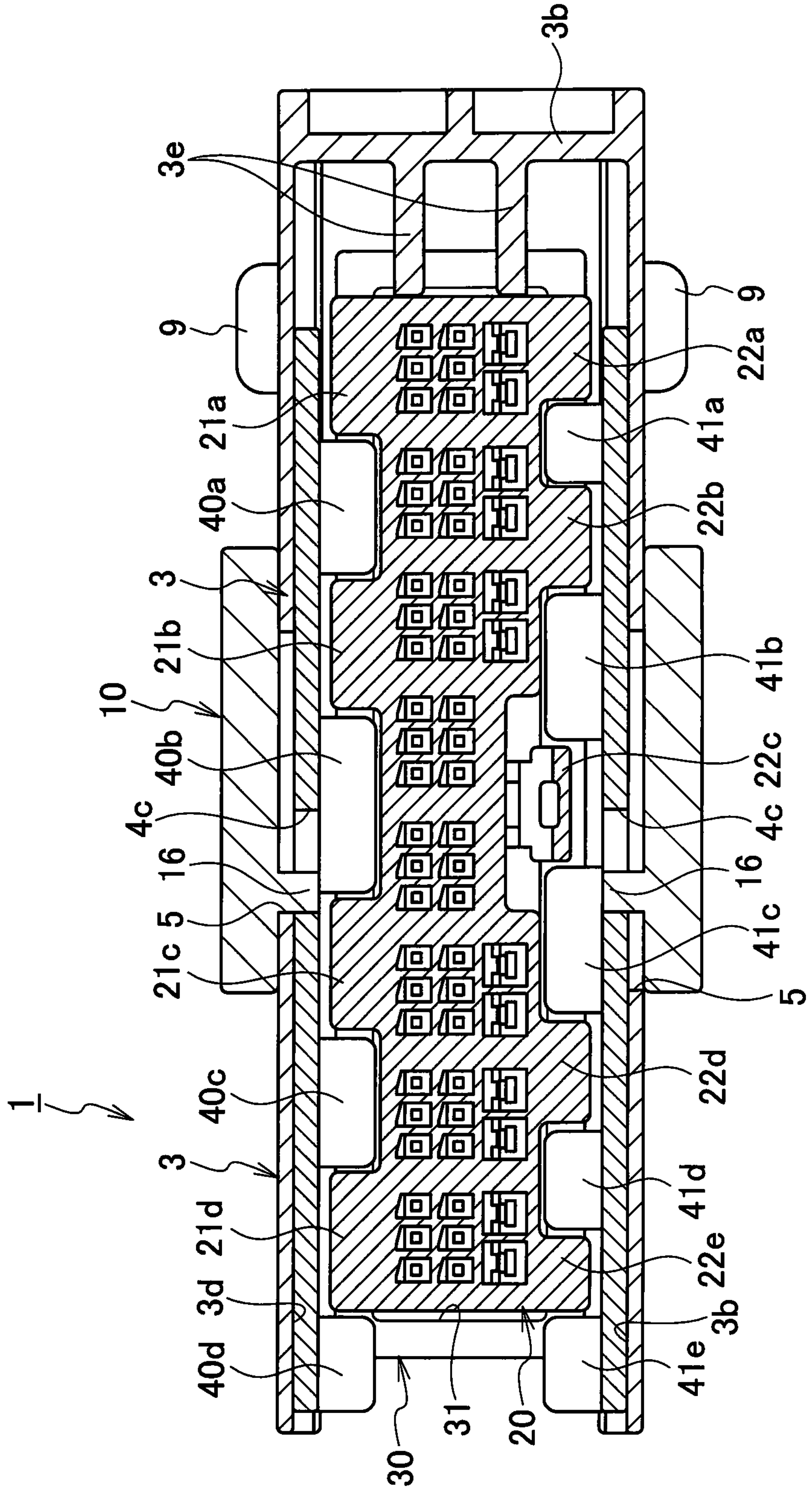
FIG. 17 is a sectional view of FIG. 14 along the line D-D, showing one embodiment of the present invention.

When the lever body 10 is operated for rotation to the fitting-operation completion position, as shown in FIG. 14, the male connector 30 is drawn to the fitting completion position. Also as shown in FIG. 17, the pair of slidable members 4A and 4B moves to the connector-holding release position. This allows the female connector 20 to be removable from the bottom side of the connector mount portion 3, thereby allowing the lever jig 2 to be detachable from the female connector 20. As shown in FIG. 15, the lever jig 2 is detached from the female connector 20, thereby the connector fitting work is completed.

Incidentally, after the female connector 20 is detached from the lever jig 2, when the lever body 10 is operated for reverse rotation from the fitting-operation completion position to the fitting-operation start position, the pair of slidable members 4A and 4B returns from the connector-mounting release position to the connector initially-holding position.

As described above, the lever jig 2 includes: the connector mount portion 3 for inserting the female connector 20 to the mounted position; the slidable members 4A and 4B which are slidably supported by the connector mount portion 3, hold the female connector 20 in the mounted position, and move to the connector-holding release position by the slide movement to release the female connector 20 from holding in the mounted position; and the lever body 10 which is movably supported by the connector mount portion 3 and moves the slidable members 4A and 4B to the connector-holding release position in the fitting-operation completion position. Accordingly, the lever jig 2 is operated from the fitting-operation start position to the fitting-operation completion position, and only after the lever jig 2 is operated to the fitting-operation completion position, the lever jig 2 becomes detachable from the female connector 20. As described above, the detachment is not possible in the half-fitted state between the female connector 20 and the male connector 30, thereby surely preventing the detachment in the half-fitted state between the female connector 20 and the male connector 30.

The female connector 20 has the plurality of protruding fixation parts 21*a* to 21*d* and 22*a* to 22*e*, and the pair of slidable members 4A and 4B has the plurality of protruding fixation parts 40*a* to 40*d* and 41*a* to 41*e* in the positions corresponding to the protruding fixation parts 21*a* to 21*d* and 22*a* to 22*e* of the female connector 20. Each of the protruding fixation parts 21*a* to 21*d*, 22*a* to 22*e*, 40*a* to 40*d* and 41*a* to 41*e* of the female connector 20 and the pair of slidable members 4A and 4B is configured to be in an overlapped position in a position other than the connector-holding release position for the pair of slidable members 4A and 4B and to be in a non-overlapped position in the connector-holding release position for the slidable members 4A and 4B. Accordingly, since the elastic deformation as in the connector stop tabs of the conventional example is not utilized, there is no deformation even in the repeated works, thereby enhancing durability and reliability as the lever jig 2.

What is claimed is:

1. A lever jig which is mounted on one of a pair of connectors and causes fitting force to act on the pair of connectors by an operation from a fitting-operation start position to a fitting-operation completion position so as to move the pair of connectors from a fitting start position to a fitting completion position, the lever jig comprising:

a connector mount portion capable of having one of the pair of connectors inserted to a mounted position;

slidable members, each comprising a pin interference hole having a circular-arc shape along a rotation locus and set as a shorter size than the range of the rotation locus that are slidably supported by the connector mount portion, hold one of the pair of connectors in the mounted position, and move by a slide movement to a connector-holding release position to release one of the pair of connectors from holding in a holding position; and a lever body comprising a slidable pin that meets the pin interference hole and that is movably supported by the connector mount portion wherein slidable members do not slide during the first half of operation of the lever body and in the latter-half operation of the lever body at the fitting-operation completion position, moves the slidable members to the connector-holding release position.

2. A connector apparatus comprising:

a pair of connectors that are fittable each other; and the lever jig of claim 1 that is mounted on one of the pair of connectors.

3. A lever jig which is mounted on one of a pair of connectors and causes fitting force to act on the pair of connectors by an operation from a fitting-operation start position to a fitting-operation completion position so as to move the pair of connectors from a fitting start position to a fitting completion position, the lever jig comprising:

a connector mount portion capable of having one of the pair of connectors inserted to a mounted position;

slidable members that are slidably supported by the connector mount portion, hold one of the pair of connectors in the mounted position, and move by a slide movement to a connector-holding release position to release one of the pair of connectors from holding in a holding position; and a lever body that is movably supported by the connector mount portion and in the fitting-operation completion position, moves the slidable members to the connector-holding release position, wherein the slidable members have protruding fixation parts in positions corresponding to protruding fixation parts of one of the pair of connectors, and respective protruding fixation parts on the right and left of the slidable members move, in a position other than the connector-holding release position for the slidable members, to a position to overlap with the protruding fixation parts of one of the connectors, and in the connector-holding release position for the slidable members, to a position not to overlap with the protruding fixation parts of one of the connectors.

4. A connector apparatus comprising:

a pair of connectors that are fittable each other; and a lever jig that is mounted on one of the pair of connectors, and causes fitting force to act on the pair of connectors by an operation from an operation start position to an operation completion position so as to move the pair of connectors from a fitting start position to a fitting completion position, wherein one of the connectors is provided to be mounted on the lever jig and detached from a mounted position, the lever jig has:

a connector mount portion capable of having one of the connectors inserted in the mounted position;

slidable members that are slidably supported by the connector mount portion, hold one of the connectors in the mounted position, and move by a slide movement to a connector-holding release position to release one of the connectors from holding in the mounted position; and a lever body that is movably supported by the connector mount portion and moves the slidable members to the connector-holding release position in a fitting-operation completion position, wherein one of the connectors has a plurality of protruding fixation parts, the slidable members has a plurality of protruding fixation parts in positions corresponding to the protruding fixation parts of one of the connectors, and each of the protruding fixation parts of one of the connectors and the slidable members moves, in a position other than the connector-holding release position for the slidable members, to a position to overlap each other, and in the connector-holding release position for the slidable members, to a position not to overlap each other.

* * * * *